United States Patent

[11] 3,624,660

[72] Inventor: Manfred Fichter, Weiler, Germany
[21] Appl. No.: 51,766
[22] Filed: July 2, 1970
[45] Patented: Nov. 30, 1971
[73] Assignee: Kienzle Apparate GmbH, Villingen, Germany
[32] Priority: July 9, 1969
[33] Germany
[31] P 19 34 731.0

[54] DRIVE FOR APPARATUS RECORDING OPERATIONAL CONDITIONS OF A CAR
15 Claims, 8 Drawing Figs.

[52] U.S. Cl. .................................... 346/49, 346/62
[51] Int. Cl. .................................... G07c 5/12, G01d 9/30
[50] Field of Search .................................... 346/49, 62–64, 116, 117

[56] References Cited
UNITED STATES PATENTS
3,383,696   5/1968   Fichter .................. 346/49 X Primary Examiner—Joseph W. Hartary
Attorney—Michael S. Striker ABSTRACT: The distance travelled by a car, and the time periods during which one, or two operators, actually drive the car or are performing auxiliary services like waiting or loading, are simultaneously recorded by at least two oscillatory recording means driven by rotary operating means rotated by one synchronous motor receiving pulses from two pulse generators, one of which is activated when the car travels a distance, and the other of which is activated by a manual switch. The polarity of every alternate pulse is reversed by an electronic control circuit so that the synchronous motor is driven by alternating current. Switch means cause a rotation of the synchronous motor in opposite directions during movement and standstill of the car. The operating means associated with the travelled distance, is driven only when the motor rotates in one direction, while the operating means associated with the working time periods, causes different oscillations of the respective recording means when the motor rotates in opposite directions.

INVENTOR
Manfred Fichter

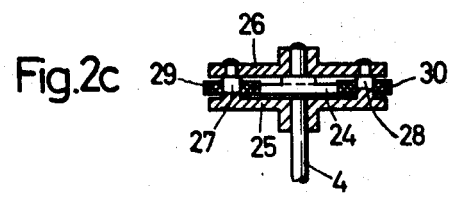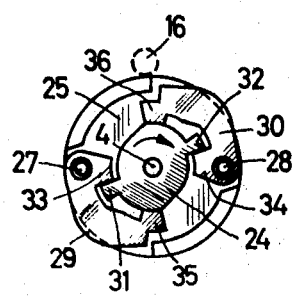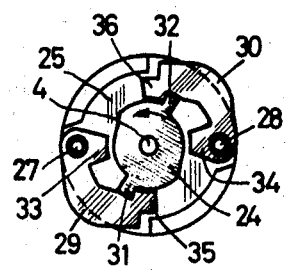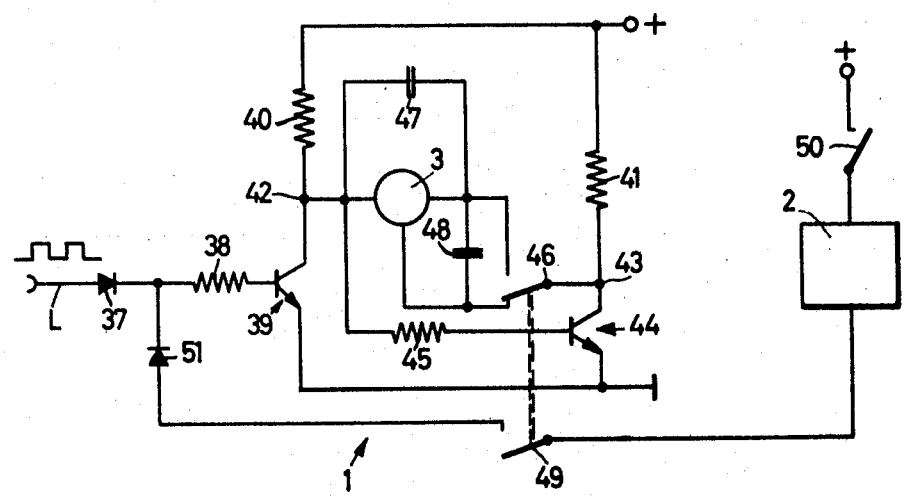

INVENTOR
Manfred Fichter

3,624,660

DRIVE FOR APPARATUS RECORDING OPERATIONAL CONDITIONS OF A CAR

BACKGROUND OF THE INVENTION

The present invention relates to a drive for an apparatus by which operational conditions are electrically measured, indicated, and recorded. Apparatus of this type is particularly used for recording distances travelled by a car, and also for recording in a distinct manner the times spent by one or two operators driving the car, or performing auxiliary services which require presence of the driver, but not driving of the car.

Apparatus of this type is known in which the rotary speed of the engine, and the speed of the car, are recorded by means of an electric circuit. This is due to the fact that the transmission of a measured value from the wheel of the car, or from the transmission of the same, by mechanical means has caused disturbances, aside from the difficulties presented by the assembly of such a mechanism. If the measured value is electrically transmitted, it is advantageous to perform the measuring operation also electrically, and to substitute electrical apparatus for the conventional mechanical measuring apparatus, which reliably operates, but requires a great drive torque due to the inclusion of oscillatory means and eddy current devices.

Electrical measuring and recording apparatus used in a car must be mechanically strong, and not sensitive to voltage fluctuations or jerks, and must have a comparatively long span of life during which no servicing operations are required. Particularly if, as in the case of a recording device, the number of rotations and the speed values are not only measured and indicated, but also graphically recorded, substantial forces are required as compared with indicating instruments.

A measuring circuit operating in accordance with the compensation principle, in which the indicated actual value is continuously compared with a transmitted desired value, is adjusted when the actual value differs from the desired value, until no difference between the actual and desired values exists. The transmission of the desired value is effected by pulses representing the operational condition of the car, and whose frequency should be high enough, even at low rotary speeds, so that the pulsation factor, remaining after rectifying of the transmitted pulses, cannot influence the motor driving the measuring apparatus.

In an arrangement of this type, in which it is not necessary to transmit pulses into the measuring apparatus for determining the speed, it is necessary to provide an additional drive means for registering and recording the traveled distance. This drive means, for example a stepping mechanism, cannot operate at the high frequencies required for speed measuring. Recording apparatus for cars do not only record the travelled distance in the form of a zigzag graph, but also desirably record the time periods during which an operator either drives the car, or performs additional auxiliary services, such as waiting, or loading. Particularly, if the car is a truck or trailer, travelling long distances, two operators are present who alternate in driving the car, and resting so that the movement of the truck or trailer need not be interrupted. It is known to record a type of service, driving or waiting, for each operator by individual zigzag graphs having different amplitudes for indicating driving and auxiliary services of each operator.

SUMMARY OF THE INVENTION

It is one object of the invention to provide a recording apparatus for a car with electrical transmission of the measured value not only for recording and registering of the travelled distance, but also for recording different services of one or two operators under the control of a single drive unit so that a very simple construction as compared with the prior art is obtained.

Another object of the invention is to obtain different recordings by causing rotation of a drive motor in opposite directions.

Another object of the invention is to use a synchronous motor for driving a plurality of recording means.

Another object of the invention is to operate the synchronous motor by an alternating current produced by reversing the polarity of alternate pulses supplied by pulse generators and representing, for example, the distance travelled by a car, or the presence of an operator.

In accordance with the invention, a single electromotor, whose direction of rotation can be reversed, is used for driving devices for registering and recording the travelled distance, as well as for recording working time periods of one or two operators.

In the preferred embodiment of the invention, a synchronous motor is used, and driven by pulses representing operational conditions of the car, the polarity of every alternate pulse being reversed by an electronic circuit so that an alternating current is supplied to the synchronous motor.

The advantage of such an arrangement is particularly that a synchronous motor is far less susceptible to disturbances caused by the motion of the car on rough roads, than a stepping motor which is otherwise very well suited for being driven by pulses. It is a well known advantage of the stepping motor, which on the other hand requires an expensive control circuit, that the stepping motor can be directly turned by rectangular pulses, considering the fact that the generation and transmission of rectangular pulses of variable frequency, is the most simple and least expensive way of electrically controlling the recording means of the car. On the other hand, this advantage of the stepping motor as compared with the synchronous motor, is responsible for the susceptibility of the stepping motor to disturbing pulses. Another disadvantage of stepping motors is that the torque thereof has various resonance values within the required range of rotary speeds. This is not the case for a synchronous motor, which furthermore is comparatively inexpensive. The only possible disadvantage of the synchronous motor could be the requirement that a synchronous motor must be operated by an alternating current, and this disadvantage is overcome in accordance with the present invention by an electronic control circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 illustrates a cam device responsive to opposite directions of rotation to vary its diameter, and includes FIGS. 2a and 2b which are side views illustrating two different operation positions, and FIG. 2c which is an axial section, the cam device being schematically shown in FIG. 1;

FIG. 3 is a diagram illustrating an electronic circuit indicated by a rectangle in FIG. 1;

DESCRIPTION OF THE PREFERRED EMBODIMENTS

Figure 1:
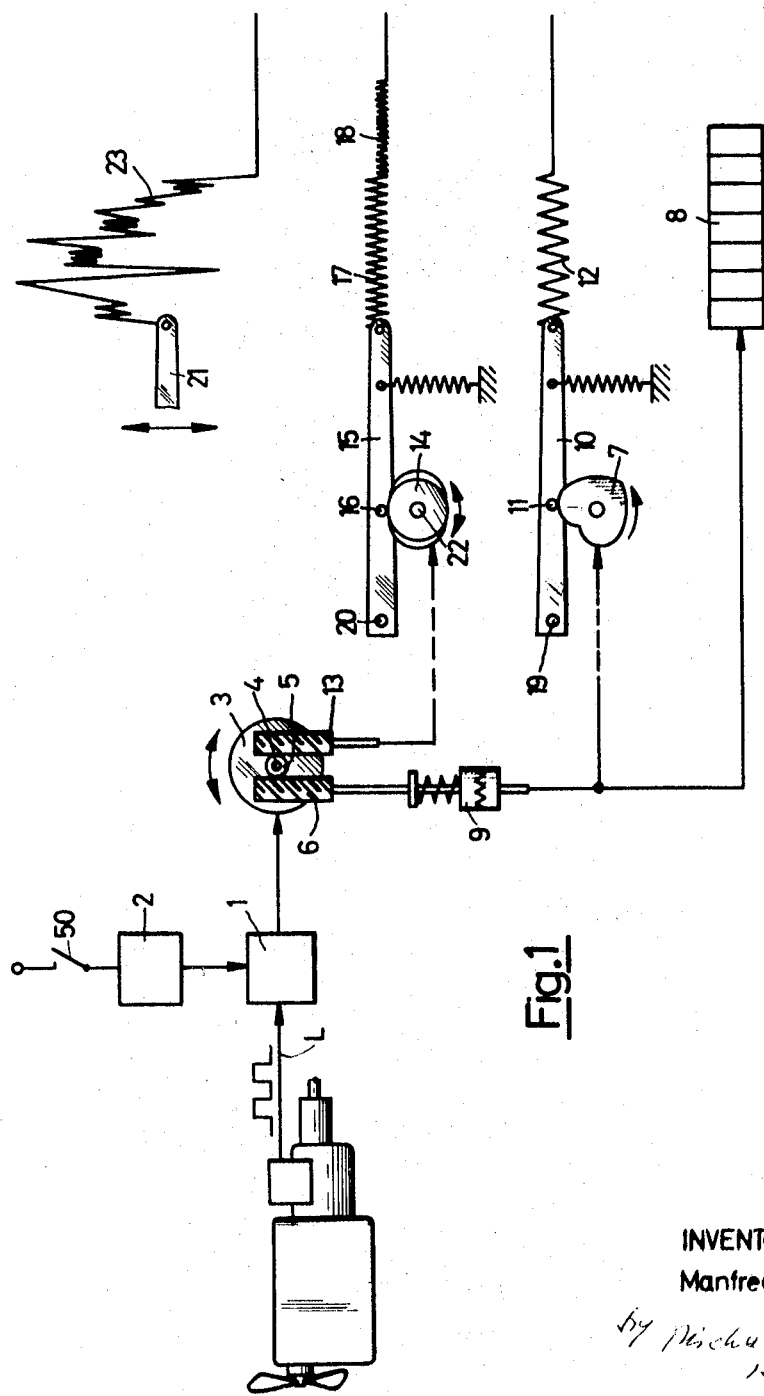
FIG. 1 is a fragmentary schematic view illustrating the general arrangement of an apparatus in accordance with one embodiment of the invention.

A pulse generator transmits rectangular pulses through the line L to a control circuit 1, schematically indicated in FIG. 1 and shown in detail in FIG. 3. The frequency of the pulses, which have the same polarity, varies in accordance with the distance travelled by the car, while the amplitude of the pulses remains the same even at low speed of the vehicle. The pulsating direct current supplied by the pulse generator to the control circuit 1 is transformed in the same into an alternating current in which pulses of different polarity alternate, as will be explained with reference to FIG. 3. Another pulse generator, preferably a multivibrator 2, supplies a series of pulses having the same polarity at a constant frequency to the control circuit 1, in which the pulses of pulse generator 2 are transformed into an alternating current. As best seen in FIG. 3, a manually operable switch 50 is connected in series with pulse generator 2, and switch 50 is closed when the car is at a standstill so that instead of the distance representing pulses supplied through line L from the first pulse generator, the pulses of pulse generator 2 are supplied to the control circuit 1. The alternating current into which one or the other series of pulses was transformed, is supplied to a synchronous motor 3 whose shaft 4 carries a worm gear 5 cooperating with a worm screw 6 and with a worm screw 13. Worm screw 6 drives the drive part of a one-way clutch 9 whose output is connected by schematically indicated transmission with the shaft of a heart cam 7 cooperating with the follower of a recording arm 10 which is turnable about a pivot 19 and has a recording point producing a zigzag-shaped recorded graph 12 when the heart cam 7 is rotated in one direction which corresponds to the direction of rotation of synchronous motor 3 which can be transmitted through the one-way clutch 9. A registering counter 8 is also driven from the output part of the one-way clutch 9, and registers a number representing the distance travelled by the car. When synchronous motor 3 rotates in the opposite direction, in which no turning movement is transmitted by the one-way clutch 9, counting register 8 and heart cam 7 are not driven, and a straight line instead of a zigzag line is recorded by recording element 10. A spring holds recording means 10 in the position in which cam follower 11 engages heart cam 7.

The worm gear 13 drives the shaft 22 of a cam device 14 whose construction will be explained in detail with reference to FIG. 2. It is possible to omit worm gear 13, and the directly drive shaft 22 by motor shaft 4. Cam device 14 is the operating means for the recording element 15 which is pivoted at 20 and is oscillated by the rotating cam device 14. As will be explained with reference to FIG. 2, cam device 14 is responsive to opposite speeds of rotation of shaft 22 to assume a greater or smaller diameter so that in one direction of rotation of motor 3, a wide amplitude zigzag recording 17 is made, and during rotation of motor 3 in the opposite direction, a narrow zigzag recording 18 is made. A spring holds recording element 15 in a position in which its cam follower 16 abuts the periphery of the cam device 14. The wide-amplitude recorded graph 17 represents time periods during which an operator actually drives the car, while the small-amplitude recorded graph 18 represents time periods during which the operator was waiting, or loading, or ready to perform his duties. Another pivotally mounted recording element 22 is driven by a part of the car, not shown, to record the varying speed of the car in a graph 23. All recordings are made on a record carrier sheet which is moved by a clockwork so that graph portions made at the same time are aligned in FIG. 1. It will be seen that the speed graph 23 indicates no speed while the graph portion 18 indicates waiting of the driver, and graph 12 illustrates by a straight line the standstill of the car. While the speed graph 23 indicates movement of the car, graph 12 indicates the distance travelled by the car, and graph portion 17 indicates that the operator was actually driving the car.

Referring now to FIG. 3 which illustrates the electronic control circuit 1 schematically shown in FIG. 1, and also motor 3 and the line L through which a series of pulses is transmitted representing the distance travelled by the car, the pulses pass through a diode 37 and a safety resistor 38 to the base of a transistor 39. The collector of transistor 39 is connected at 42 to the synchronous motor 3 and also to a resistor 40 which is connected to the plus terminal of a voltage source whose other terminal is grounded. Another resistor 41 is connected at a point 42 to the collector of a transistor 44 whose emitter is connected with ground, and also with the emitter of transistor 39. A resistor 45 connects the base of transistor 44 with point 42 and motor 3. A capacitor 47 is connected in parallel with synchronous motor 3, and dampens the peak voltages occurring when the motor is disconnected, and also causes favorable steep flanks of the pulses during starting of the motor, while the capacitor 48 obtains a phase shift required for the two phase synchronous motor 3. Reversing switch means include a switch 46 connected with motor 3 and point 43, and a switch 49 connected in series with a diode 51 and with pulse generator 2 which is connected by a manually operated switch 50 to the positive terminal of the voltage source. Diode 51 is connected with line L between diode 37 and resistor 38.

Resistors 40 and 41 constitute a voltage divider for motor 3. Whenever the direction of the current is reversed between points 42 and 43, the synchronous motor 3 turns one step. Assuming that transistor 39 is nonconductive, a positive pulse arriving through resistor 38 at the base of transistor 39, renders the same conductive so that point 42 is grounded, and the voltage becomes zero. At the same time, transistor 44 is rendered nonconductive by resistor 45. Reversing switch means 46, 49 is in the illustrated position when the car moves, and is shifted when the car is at a standstill. Reversing switch means 46, 49 may be controlled by the recording means 21 which responds to the start and stopping of the movement of the car. In the illustrated position, in which the car is assumed to move, reversing switch 46 permits the current to flow from point 43 to point 42 so that synchronous motor 3 turns one step. When the voltage at the base of transistor 39 again drops, transistor 44 becomes nonconductive, and current flows in the opposite direction from point 42 to point 43. Synchronous motor 3 turns again one angular step in the same direction, and is maintained by the continuous current in the new position until the voltage at the base of transistor 39 is again changed. This means that the electronic control circuit 1 transforms the arriving pulsating direct voltage into an alternating current permitting the use of a comparatively inexpensive synchronous motor 3 as drive means for the operating means 14 and 7 of recording means 15 and 10, and also for the registering counter 8.

As described above, the synchronous motor 3 rotates in a first direction which corresponds to the direction of rotation at which one-way clutch 9 transmits rotary motion, so that heart cam 7 is rotated, and registering counter 8 is operated while the car moves. At the same time, the operating means 14 is rotated in a direction corresponding to the first direction of rotation of motor 3. Motor 3 rotates in this first direction only while the car moves, and when being driven by pulses whose frequency represents the distance travelled by the car. When the car stops, reversing switch 46, 49 is shifted, the line connecting point 43 with motor 3 is interrupted, and the line connecting the second pulse generator 2 with diode 51 and transistor 39, is closed by the closing reversing switch 49.

Assuming that the operator of the car, as is in its own interest, has closed the manually operated switch 50 at the beginning of his working time, so that waiting periods or time required for repairing or serving the car, are also registered, pulses generated by the multivibrator 2 are supplied through switch 49, diode 51, resistor 38 and transistor 39 so that the motor 3 starts running in a second opposite direction of rotation due to the fact that switch 46 is now open. Due to the reversal of the direction of rotation of motor 3 taking place when the car is at a standstill, and the operator has closed manually operated switch 50, no motion is transmitted to heart cam 7 and to the registering counter 8, and cam device 14 is rotated in the opposite direction as compared with the direction of rotation thereof during movement of the car. As noted above, operating means 14 is a cam device which is so constructed that it changes its diameter when rotated in opposite directions, so that recording element 15 is oscillated different amplitudes, and recorded graphs 17 and 18 of different amplitudes are made.

The construction of the cam device 14 is shown in detail in FIG. 2. It is assumed that the cam device is directly mounted on shaft 4 of the synchronous motor, but as explained with reference to FIG. 1, a transmission may be provided between shaft 4 of the motor and an input shaft 22 of the cam device 14. In any event, a drive member 24 is fixed to the drive shaft 4 or 22, and has two diametrically disposed lugs 31 and 32. Two rotary carrier discs 25 and 26 are connected with each other and mounted on shaft 2 for free rotation. Two cam arms are mounted between the carrier discs 25 and 26 in the plane of the drive part 24, and are mounted on pivots 27 and 28 for angular movement relative to carrier discs 25 and 26.

When shaft 4 rotates in clockwise direction, as shown in FIG. 2a, lugs 31 and 32 abut the projecting noses 33 and 34 of cam arms 29 and 30 since the carrier discs 25 and 26 are held temporarily nonrotatably due to friction between the spring-biased cam follower pin 16 of recording means 15 and the peripheral cam track of carrier discs 25 and 26. When shaft 4 continues to turn in clockwise direction, the pressure on noses 33 and 34 eccentric to the pivot points 27 and 28, turns the cam arms 29 and 30 inward to a retracted position shown in FIG. 2a in which cam arms 29 and 30 project only very little beyond the circular periphery of the carrier discs 25 and 26. In this position, carrier discs 25 and 26 rotate with cam arms 29 and 30, so that the cam follower 16 is displaced when instead of the circular periphery of the carrier discs 25 and 26, the projecting portions of cams 29 and 30 engage cam follower 16. Due to the fact that cam arms 29 and 30 project only little beyond the periphery of carrier discs 25 and 26, the amplitude of the oscillating movement of recording element 15 is small, and the narrow zigzag graph 18 is recorded.

When the direction of rotation of synchronous motor 3 is reversed, as explained above, during standstill of the car, carrier discs 25 and 26 rotate in counterclockwise direction as shown in FIG. 2b, so that lugs 31 and 32 engage the free ends of cam arms 29 and 30 and urge the same outward to project farther from the circular periphery of carrier discs 25 and 26 so that cam follower 16 is displaced a greater radial distance when moving from the carrier discs 25, 26 to one of the cam arms 29, 30, and recording means 15 is oscillated at a greater amplitude to make the wider zigzag recording 17.

Since it is assumed that the operator, starting his shift, has closed the manually operated switch 50 a certain time before the car was actually started, the beginning of the narrow zigzag graph 18 registers with portions of graphs 12 and 23 indicating standstill of the car so that it is apparent that the operator has spent some time ready and waiting, and has later driven the car. The actuation of switch 50 causes the reversal of synchronous motor 3, provided that reversing switch 46, 49 is in a position associated with standstill of the car. During movement of the car, switch 50 is disconnected by the open switch 49, the pulses of pulse generator 2 cannot reach the control circuit with motor 3, and the same is driven by the pulses supplied by the pulse generator which responds to the distance travelled by the car to transmit pulses having a corresponding frequency to line L. While motor 3 rotates during standstill of the car only for operating cam device 14 to effect the recording of graph 18, recording means 10 and counter 8 are not operated since one-way clutch 9 does not transmit rotation in this direction of rotation.

Figure 4:
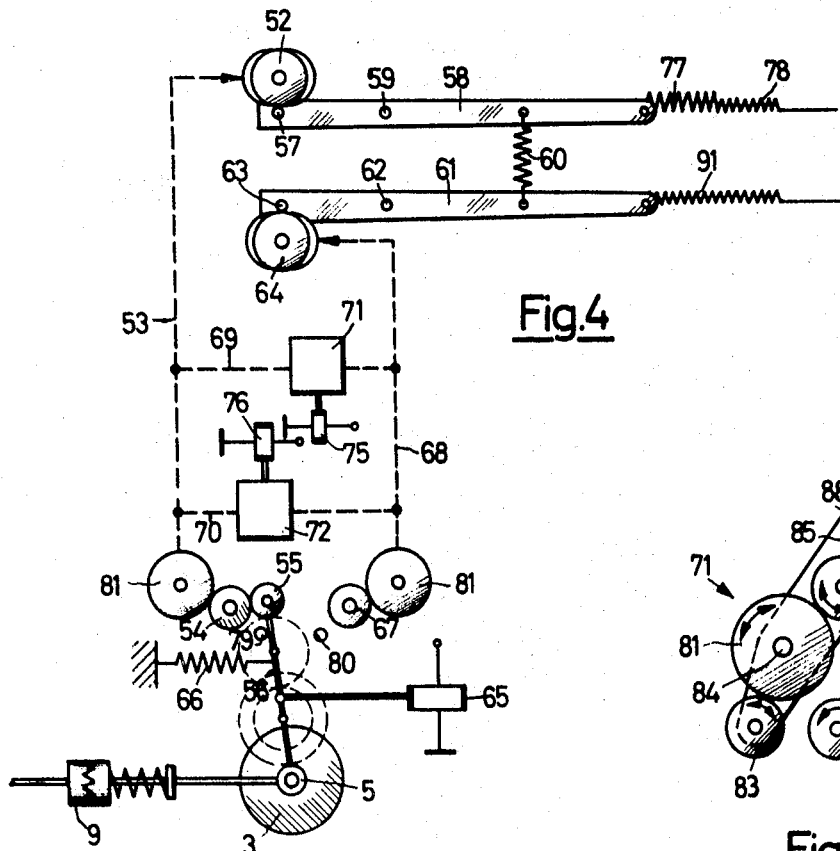
FIG. 4 is a schematic diagram illustrating a drive in which two recording elements record graphs respectively associated with two operators.
Figure 5:
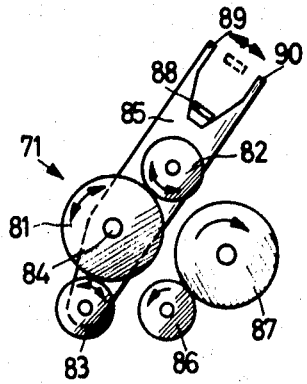
FIG. 5 is a fragmentary view illustrating a transmission used in the embodiment of FIG. 4 which transmits rotary motion only in one direction of rotation of two opposite directions of rotation in which it is driven.
Figure 6:
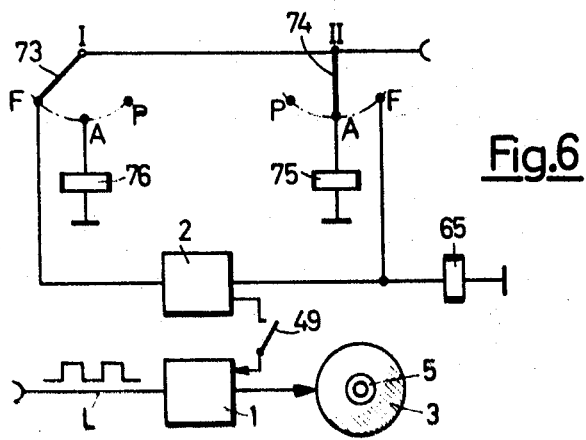
FIG. 6 is a fragmentary diagram and schematic view illustrating the control of the motor of the embodiment of FIG. 4 by switches respectively associated with two drivers.

The apparatus described with reference to FIGS. 1 to 3 permits the recording of the working time, and more specifically of the driving periods and waiting periods of one operator. In the embodiment of FIGS. 4, 5 and 6, it is assumed that the car, for example a truck or trailer truck, is alternately operated by two operators, one of which may drive while the other sleeps, as is customary for the movement of large loads over long distances. Particularly, if the record carrier sheet is to be used as the basis for the payments to the crew, it is necessary to record the entire working time of each driver, and more particularly the kind of work which each driver was doing during different time periods, since rest periods are not as highly paid than periods of driving the car.

As shown in FIG. 4, the synchronous motor 3 drives through a worm gear 5 on a shaft, and a worm 6, not shown, the one-way clutch 9 which drives the heart cam 10 and the counter 8 as described with reference to FIG. 1. The worm gear 5 also drives a gear train mounted on a pivotable supporting arm 56 whose last gear 55 meshes either with a gear 54, or with a gear 67, and is urged by a spring 66 to assume the position shown in FIG. 4 in which gear 55 meshes with gear 54. An electromagnet 65 is connected with the arm 56, and as shown in FIG. 6, electromagnet 65 is grounded, and also connected to the positive terminal of a voltage source through two manually operated selector switches 73 and 74 which are respectively associated with an operator I and an operator II. When electromagnet 65 is energized by placing one of the selector switches 73, 74 manually in the position F, which indicates driving of the car by the respective operator, an electromagnet 65 is energized and not only shifts arm 56 to the position in which gear 55 drives gear 67, but also energizes the pulse generator, such as a multivibrator 2 which, as described with reference to FIG. 3, supplies pulses to the electronic switching device 1, which has been described with reference to FIG. 3. It will be noted that the circuit diagram in FIG. 6 replaces the right part of FIG. 3, since in the embodiment of FIG. 3 only one operator controlled switch 50 is provided, while in the embodiment of FIG. 6, which is intended for operation by two operators, two selector switches 73 and 74 are provided.

Instead of the single recording means 15 of the embodiment of FIG. 1, two recording elements 58 and 61, connected by a spring 60, are provided and mounted on pivots 59 and 62 for oscillatory movement when the respective cam follower 57 and 63 is displaced by the respective cam device 52 and 64, the cam devices 52 and 64 being constructed in the same manner as the cam device 14 shown in FIG. 2. The two recording elements 58 and 61 are respectively associated with two operators, and are capable of making zigzag recordings of different amplitude, for example 77 and 78 made by recording element 58, and the narrow zigzag recording 91 made by recording element 61.

The shaft of cam device 52 is driven through a transmission between gear 54 and the shaft of cam device 52, and as explained with reference to FIG. 2, cam device 52 will have a different shape depending on the direction of rotation which is transmitted from motor 3 through gears 55, 54 and transmission 53 so that, depending on the direction of rotation of motor 3, recordings of different amplitude 77 and 78 are made.

The shaft of cam device 64 is driven by another transmission 68 and also varies its shape when rotary motion in opposite directions is transmitted from motor 3 through gears 55, 67 and transmission 68 to the shaft and drive part of cam device 64. Cam device 52 will operate when arm 56 is in the position illustrated in FIG. 4, and cam device 64 will be operated when arm 56 is in the position in which gear 55 meshes with gear 64, to which arm 56 was shifted by connector mass 65.

The gear trains or transmissions 53 and 68 are connected by two gear trains 69 and 70 which respectively include "rectifying" transmissions 71 and 72 which are constructed in the same manner as shown for rectifying transmission 71 in FIG. 5. Each rectifying transmission includes a gear 81 which may be a part of transmission 53 or of transmission 68, and which is rotated in opposite directions corresponding to the rotation of motor 5. Gear 83, gear 81 meshing with the same, and gear 82, are mounted in a pivoted arm 85 which has a recess with a pair of prongs 89 and 90 in which a shiftable stop 88 is located. Arm 85 can turn about shaft 84 of gear 81 to a position in which gear 82 meshes with a gear 87 which drives the output gear 86 which may be part of the transmission 68. When the respective electromagnet 75 of transmission 71, or 76 of transmission 72, is energized due to placing of one of the selector switches 73, 74 in the position A, stop 88 is displaced from the position shown in solid lines in FIG. 5, in which arm 85 cannot turn, to the position shown in broken lines in which arm 65 can turn to the position in which gear 82 engages gear 87 for driving gear 85 which drives through transmission 68 the input part of the cam device 64, assuming that transmission arm 56 is in the position illustrated in FIG. 4, and cam device 52 is directly driven through transmission 54, 53. When gear 81 is rotated from motor 3 through gears 55, 54 and transmission 53, and rotates in clockwise direction, the pivoted arm 85 is turned in clockwise direction due to the meshing friction between gears 81, 82 and gears 81 and 83, so that gear 82 meshes with gear 87 which is driven in clockwise direction and drives gear 86 and the cam device 64. In the opposite counter-clockwise direction of rotation of gear 81, the pivoted arm 85 is turned in the opposite direction so that gear 83 meshes with the output gear 86, and cam device 64 is driven in the opposite direction. In the position of the selector switches 73 and 74, independently of the direction of rotation of motor 3 and transmission 53, and independently of the operational condition of the car, which may move or be at a standstill, the cam device 64 is also driven in the same direction of rotation. The term "rectifying" transmission has been used for the transmissions 71 and 72 since irrespective in which direction of rotation the input gear 81 is rotated, the output gear 86 will always rotate in the same direction.

As shown in FIG. 6, each of the selector switches 73, which are respectively associated to operators, and the recording means 58 and 61, is manually turnable between three positions, namely position F representing driving of the car by the respective operator, position A representing working of the respective operator, but not driving the car, and a position P representing a pause or rest period. Selector switches 73 and 74 are connected with a positive terminal of a voltage source, and establish a connection between the same and ground when placed in the positions A in which electromagnets 76 and 75 are energized, respectively. Electromagnets 76 and 75 control the stops 88 of the two rectifying transmissions 71 and 72.

Assuming that only one operator is in the car, he sets his associated selection switch 73 to the position F. In this position the second pulse generator 2 would transmit pulses to the electronic switching device 1 as long as reversing switch 49 is closed so that the recording 78 is made, but assuming that the car is started and the operator I begins to drive, switch 49 opens, pulse generator 2 is disconnected, and the electronic switching means 1 supplied with pulses from the first pulse generator representing the distance covered by the car. As explained with reference to FIG. 3, synchronous motor 3 is driven and rotates in one direction as long as distance representing pulses are supplied during movement of the car. The rotary motion of motor 3 is transmitted to the gear train of arm 56, gears 55, 54 and gear train or transmission 53 to the shaft and input part of the cam device 52, and the direction of rotation is such that the maximum diameter of cam device 52 is increased so that recording means 58 records a zigzag recording 72 of wide amplitude, indicating that operator 1 has driven the car. When the car stops, no distance representing pulses are supplied, and reversing switch 49 closes so that the pulses from pulse generator 2 are supplied to the electronic switching means 1 and synchronous motor 3, rotating the same in the opposite direction, as explained with reference to FIG. 3. In this direction of rotation, the cam arms of cam device 52 are retracted, as explained with reference to FIG. 2, so that the recording means 58 oscillates at a smaller amplitude making a narrow zigzag recording of the width shown for recording 78.

In the event that the operator forgets to place his associated selector switch in the position F for driving, and leaves switch 73 in the position P, or erroneously places the switch 73 in the position A, nevertheless driving time is recorded in the form of the wide amplitude zigzag recording 77, since the motor 3 is driven by the pulses supplied by the first pulse generator in accordance with the distance travelled by the car. However, since selector switch 73 is now in the position in which the multivibrator 2 is not connected to the voltage, no auxiliary pulses are generated by multivibrator 2, and no narrow zigzag recording is made by recording means 58 to indicate time periods during which operator 1 was working, but not driving, or rested.

The same functions occur when only operator II is present in the car, except that it is necessary to place the selector switch 74 to the position F in order to obtain a recording by recording means 61 also during movement of the car since operator I has the first choice due to the fact that the spring 66 urges arm 56 and gear 55 to the illustrated position in which gear 55 meshes with the gear 54. However, if operator II places his selector switch 74 in the position F, electromagnet 64 is energized and moves arm 56 about the shaft of motor 3 to the position in which gear 67 with transmission 68 is driven by gear 55 and the gear train on arm 56. In this position, transmission 68 drives cam device 64 to oscillate recording means 61 so that during movement of the car a wide-amplitude recording, and during standstill of the car a narrow-amplitude recording is made.

In the event that both operators are present in the car, only one of the two operators will place his associated selector switch in the drive position F. The impossible condition in which both drivers drive cannot be obtained by setting both selector switches 73 and 74 to the positions F, since an interlocking device, not shown, and of conventional construction connects the two selector switches 73 and 74 and does not permit the placing of both switches in the positions F. Therefore, the other operator II which is present in the car and therefore is considered working, although not driving, must place his associated selector switch 74 in the corresponding position A. When selector switch 73 is in the position F, and selector switch 74 is in the position A, cam device 52 of recording means 58 is driven, as explained above, in such a manner that the wide-amplitude zigzag recording 77 is made. At the same time, rotary motion is transmitted from gear 81 of transmission 73 through transmission means 69, 71 to transmission 68 so that cam device 64 is rotated to oscillate recording means 61 to make a narrow recording 91, representing the fact that operator number 2 was not driving, although present and ready for work.

Since electromagnet 75 is energized when selector switch 74 is placed in the position A, as is apparent from FIG. 6, stop 88 is shifted, and the rectifying transmission, see FIG. 5, operates to transform opposite rotary motions of gear 81 occurring during drive and standstill of the car, respectively, into rotation in the same direction of output gear 86 which drives cam device 64 so that the narrow zigzag recording 91 is made representing the less paid work of operator II during standstill as well as during movement of the car.

Evidently, if the car is driven by operator II, the same must place selector switch 74 in the position F, while operator I must place his selector switch 73 in the position A. In this event, the cam device 52 is always driven in the same direction of rotation due to a rectifying transmission 70, 72 so that only a narrow zigzag recording can be made by recording means 58 irrespective of whether the car moves or is at a standstill. On the other hand, cam device 64 is driven in opposite directions depending on whether the car is moving or is at a standstill, and when the car moves, recording means 61 makes a wide-amplitude recording, indicating that operator II was driving the car.

It will be understood that each of the elements described above, or two or more together, may also find a useful application in other types of drive arrangements for recording apparatus differing from the types described above.

While the invention has been illustrated and described as embodied in a drive for the recording apparatus of a car including a synchronous motor rotating in opposite directions when the car moves and is at a standstill, respectively, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Drive for apparatus recording operational conditions of a car, comprising, in combination, first recording means for recording at least one operational parameter of the movement of the car; first operating means rotatable only in one direction for actuating said first recording means; second recording means for differently recording driving periods and periods of readiness of at least one operator of the car; second operating means rotatable in one direction for actuating said second recording means to record said driving periods, and rotatable in the opposite direction for actuating said second recording means to record said periods of readiness; a reversible electric motor connected with said first and second operating means for driving the same; and control circuit means for said electric motor having a first condition for causing rotation of said motor in a first direction for driving said first operating means in said one direction thereof and said second operating means in said one direction thereof whereby said operational parameter and a driving period are recorded, and having a second condition for causing rotation of said motor in a second reversed direction so that said first operating means are not driven and so that said second operating means is driven in said opposite direction thereof whereby a period of readiness is recorded, and including switch means for placing said control circuit means in said first and second conditions.

2. A drive as claimed in claim 1 wherein said switch means for said control circuit means is responsive to movement of said car and causes said first condition during movement of the car, and said second condition during standstill of the car.

3. A drive as claimed in claim 1 wherein said electric motor is a synchronous motor; and wherein said control circuit means include pulse generator means for generating pulses having one polarity, an electronic switching device for reversing the polarity of alternate pulses, and for supplying the pulses to said synchronous motor so that the same receives alternating current and is rotated by the same in said first and second directions of rotation when said control circuit means is in said first and second conditions thereof, respectively.

4. A drive as claimed in claim 3 wherein said electronic switching device includes a capacitor connected in parallel with said synchronous motor.

5. A drive as claimed in claim 3 wherein said switch means include reversing switch means responsive to movement of the car to cause said first condition, and to standstill of the car to cause said second condition, and manually operated switch means; and wherein said pulse generator means include a pulse generator connected in series with said manually operated switch means and said reversing switch means for transmitting pulses to said motor in said second condition upon actuation of said manually operated switch means.

6. A drive as claimed in claim 5 wherein said pulse generator means include another pulse generator driven from a part of said car during movement of the same for generating pulses at a frequency representing said parameter of the movement of the car, said pulses at said frequency being supplied to said synchronous motor in said first condition.

7. A drive as claimed in claim 1 wherein said first operating means includes a one-way clutch operable by said motor rotating in said first direction; and a cam means driven in said one direction through said one-way clutch by said electric motor so that said first recording means is oscillated by said cam means only when said motor rotates in said first direction.

8. A drive as claimed in claim 1 wherein said second operating means includes a cam device including a drive part driven from said motor, and means for varying the shape of said cam device in response to the direction of rotation in which said drive part is driven from said motor; and wherein said second recording means includes a cam follower engaged by said cam device so that said second recording means is oscillated by said cam device in an oscillating motion whose amplitude depends on the varied shape of said cam device whereby said second recording means records a zigzag recording whose different amplitudes represent the opposite directions of rotation of said motor and thereby said driving periods and said periods of readiness.

9. A drive as claimed in claim 8 wherein said cam device includes carrier means having a periphery engaged by said cam follower, at least one cam arm pivotally mounted on said carrier means for movement to and from a position projecting from the periphery of said carrier means and adapted to engage said cam follower, and a retracted less projecting position, and wherein said drive part engages said cam arm during rotation in one direction to move the same to said projecting position, and during rotation in the opposite direction to retract said cam arm whereby said cam shape is varied in accordance with the direction of rotation of said motor and of said drive part.

10. A drive as claimed in claim 1 wherein said first and second recording means are oscillatable, and are oscillated by said first and second operating means to record zigzag lines; wherein said second operating means vary the oscillation amplitude of said second recording means when driven in opposite directions by said motor; wherein said motor is a synchronous motor; wherein said control circuit means includes a pulse generator driven from a part of the car during movement of the same for generating first pulses at a frequency representing the distance travelled by the car, said distance being said parameter, another pulse generator for generating second pulses at a constant frequency, said first and second pulses having one polarity, an electronic switching device for reversing the polarity of alternate pulses and supplying the pulses to said synchronous motor so that the same is driven by alternating current and is rotated in said first and second directions thereof when said control circuit means is in said first and second conditions thereof; wherein said switch means include reversing switch means responsive to movement and standstill of the car to cause said first and second conditions, respectively, and a manually operated switch means associated with an operator of the car, said manually operated switch means and said reversing switch means being connected in series with said other pulse generator so that said second pulses are supplied to said motor when said manually operated switch means is manually closed during standstill of the car, so that only said first pulses are supplied to said motor when the car moves and said reversing switch means cause said first condition of said control circuit and disconnection of said manually operated switch means.

11. A drive as claimed in claim 10 wherein said first operating means includes a cam and a one-way clutch connecting said motor with said cam only when said motor rotates in said first direction so that said first recording means oscillates only during movement of the car; and wherein said second operating means includes a cam device having an input drive part driven from said motor, and means for varying the shape of said cam device in response to rotation of said motor and input drive part in said first and second directions respectively, whereby said second recording means make zigzag recordings of different amplitude when said control circuit means are placed by said switch means in said first and second conditions, respectively.

12. A drive as claimed in claim 10 wherein said second recording means include two oscillatable recording elements respectively associated with two operators of the car; wherein said second operating means include two operating elements for varying the oscillation amplitude of said two recording elements, respectively, when driven in opposite directions by said motor; wherein said manually operated switch means includes two manually operated selector switches respectively associated with said operators; and comprising two transmission means selectively actuated by said selector switches for connecting said motor with said two operating elements, respectively.

13. A drive as claimed in claim 12 wherein said control circuit means includes two electromagnetic means respectively controlled by said two selector switches for selectively rendering a selected one of said transmission means operative in both directions of rotation, and the respective other transmission means operative only in one direction of rotation.

14. A drive as claimed in claim 12 comprising a shiftable transmission part, and electromagnetic means controlled by said selector keys to shift said transmission part between two positions in which said motor drives said two operating elements through one of said transmission means, respectively, and said transmission part; and two rectifying transmissions connecting said two transmission means so that the operating element which is not driven through said transmission part and the respective transmission means, is driven through the respective rectifying transmission always in the same direction of rotation irrespective of reversal of the direction of rotation of said motor.

15. A drive as claimed in claim 12 wherein each of said second operating elements includes a cam device engaging the respective second recording element for oscillating the same; wherein each cam device includes a drive part driven from said motor, and means for varying the shape of the respective cam device in response to the direction of rotation at which said drive part is driven by said motor so that each second recording element is oscillated at an amplitude depending on the different shape of the respective cam device during standstill and movement of the car.

\* \* \* \* \*